United States Patent

[11] 3,552,352

[72] Inventor Ronald Frank McConnell
Pompton Lakes, N.J.
[21] Appl. No. 705,197
[22] Filed Feb. 13, 1968
[45] Patented Jan. 5, 1971
[73] Assignee E. I. du Pont de Nemours and Company
Wilmington, Del.
a corporation of Delaware

[54] ELECTRON BEAM VAPORIZATION COATING APPARATUS
3 Claims, 4 Drawing Figs.
[52] U.S. Cl.................................................. 118/49.5,
117/93.3, 117/106, 117/107, 117/107.1
[51] Int. Cl.................................................. C23c 13/12
[50] Field of Search........................................... 117/93.3,
106, 107, 107.1; 118/48, 49, 49.1, 49.5;
219/121EB

[56] References Cited
UNITED STATES PATENTS
3,055,775 9/1962 Crittenden et al............ 118/49.1UX
3,329,524 7/1967 Smith............................ 117/107

FOREIGN PATENTS
882,171 7/1953 Germany.

Primary Examiner—Alfred L. Leavitt
Assistant Examiner—J. H. Newsome
Attorney—Claude L. Beaudoin ABSTRACT: An apparatus for the vapor deposition of refractory substances on the surface of substrate materials is provided which includes a chamber adapted to be vacuumized, means rotatably disposed within said chamber adapted to support a source of refractory material, electron-gun means operatively disposed in cooperative association with said chamber adapted to impinge a beam of electrons upon said refractory materials and means adapted to convey a substrate material adjacent openings in masking means within said chamber substantially in alignment with said source of refractory material whereby electron bombardment of said refractory material causes evaporation thereof and deposition thereof on said substrate material and rotation of said source of refractory material permits a substantially uniform rate of evaporation thereof.

PATENTED JAN 5 1971 3,552,352

INVENTOR
RONALD FRANK MC CONNELL

BY *Claude J. Beaudoin*

ATTORNEY

ELECTRON BEAM VAPORIZATION COATING APPARATUS

THE INVENTION

The present invention relates to the manufacture of coated articles and, more particularly, is directed to an apparatus for the vapor deposition of refractory substances by means of an electron beam upon substrate materials.

The coating of substrate materials such as glass and metals with refractory or sublimable materials by means of vapor deposition techniques utilizing an electron beam are now well known as exemplified by the descriptions contained in any one of U.S. Pat. Nos. 2,621,624; 3,046,936; 3,172,649; 3,267,015; 3,276,902; 3,281,265 and 3,885,997. For instance, U.S. Pat. No. 3,276,902 describes the vapor deposition within an enclosed chamber of a fusible dielectric material such as glass upon a fine mesh metal screen by directing a pulsating electron beam upon the glass material in a suitable container therefor whereby the glass material is evaporated and deposited by vapor deposition on the surface of the metal screen. Also, it has been found desirable in the evaporation of substances by an electron beam to locate the electron beam source or gun out of the evaporation path of the substance to avoid ion interaction with the electron beam and to avoid deposition of the substance on the electron beam gun which would interfere with its operation. In some instances as where materials of high thermal conductivity such as aluminum are to be evaporated and the material forms a low viscosity melt, the evaporation proceeds readily from an open molten pool thereof without special problems. However, in instances where materials evaporate by sublimation, as is the case with silicon monoxide, or where materials form viscous melts with poor thermal conductivity, as is the case with aluminum oxide ($Al_2O_3$) or silica ($SiO_2$) the electron beam will in time undercut or tunnel into the material to be evaporated. The undercutting characteristic is undesirable because it reduces the effective evaporation area, alters the evaporation pattern, and tends to direct more of the evaporant in the direction of the electron beam. The undercutting effect may be diminished to some extent by focusing or scanning the electron beam on other areas of the material to be evaporated. However, this solution introduces other problems. If the electron beam is moved suddenly from one area to another evaporation is momentarily interrupted and outgassing in the new area of impingement of the electron beam may interfere with the vacuum in the enclosed chamber or cause particles of the material to be thrown about the chamber. Moving the electron beam slowly from one area to another of the material to be evaporated although avoiding the sudden outgas problem is not satisfactory because requiring additional control circuits and does not eliminate undercutting itself. Accordingly, it is the principal object of the present invention to provide an improved process and apparatus for evaporating refractory materials that are free of the above-mentioned drawbacks.

According to the present invention there is provided an apparatus for the vapor deposition of refractory substances on the surface of substrate materials which comprises a chamber having sidewalls and top and bottom walls adapted to be vacuumized, means rotatably disposed on the bottom wall within said chamber adapted to support a source of refractory material, electron-gun means operatively disposed in cooperative association within any one of the side walls of said chamber adapted to impinge a beam of electrons upon said refractory material, and means adapted to convey a substrate material adjacent openings in masking means within said chamber substantially in alignment with said source of refractory material whereby electron bombardment of said refractory material causes evaporation thereof and deposition thereof on said substrate material and rotation of said source of refractory material permits a substantially uniform rate of evaporation thereof.

The nature and advantages of the invention will be more clearly understood by the following description and the several views illustrated in the accompanying drawings wherein like reference characters refer to the same parts throughout the several views and in which.

Figure 1:
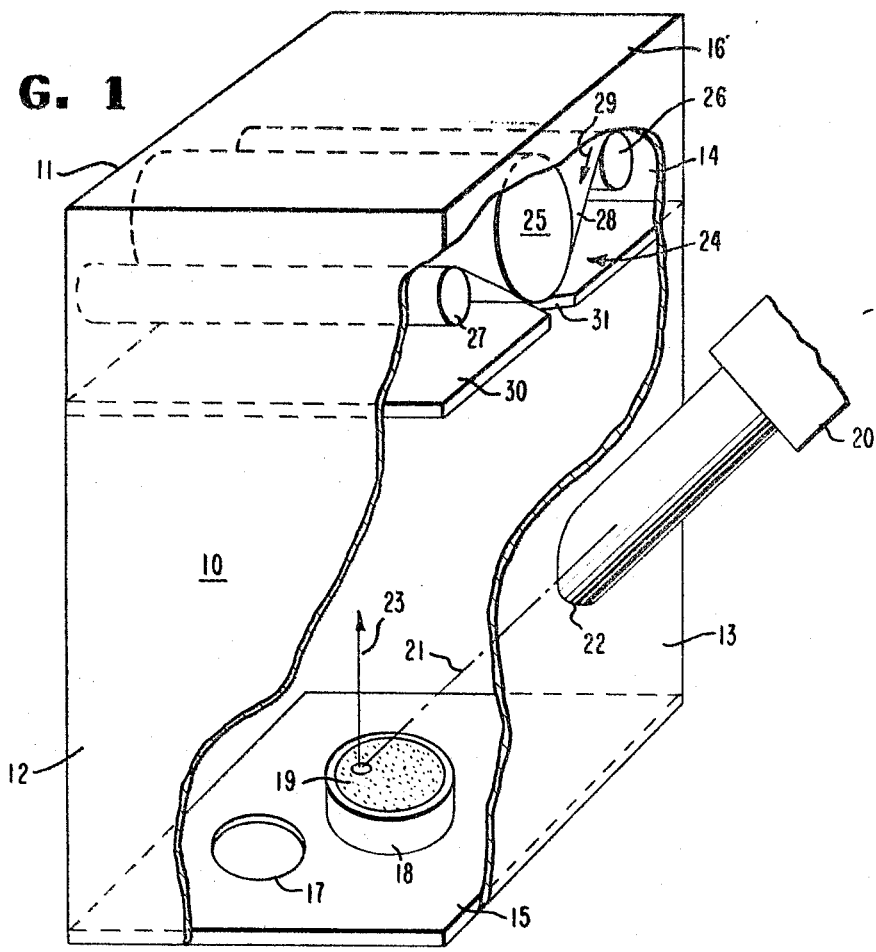
FIG. 1 is a perspective view of the general arrangement of the apparatus of the invention.

The apparatus herein disclosed in illustration of the invention is shown generally in FIG. 1 and includes a chamber 10, a crucible 18 of heat-resistant material, an electron gun 20, and conveying means 24. Referring to FIG. 1, sidewalls 11, 12, 13 and 14, bottom wall 15 and top wall 16 are so constructed and arranged to provide an enclosed chamber 10. The bottom wall 15 is provided with a suitable opening 17 adapted for connection to a suitable means (not shown) for vacuumizing chamber 10. In general, the pressure within chamber 10 should be maintained no greater than $10^{-3}$ torr (mm. of mercury). The vacuum equipment is not the subject of the present invention and may include mechanical pumps and diffusion pumps or vacuum ion pumps. The bottom wall 15 of chamber 10 supports crucible 18 which may be of graphite or of any other suitable heat-resistant and conductive material such as molybdenum or boron nitride. The crucible 18 is adapted to support or contain a source of refractory material 19 to be evaporated.

The apparatus of the invention as shown in FIG. 1 also includes an electron gun device 20 which is operatively disposed adjacent a sidewall such as 13 of chamber 10 whereby the electron beam 21 thereof when energized is directed through a suitable opening as 22 in wall 13 and impinges on refractory material 19 contained in crucible 18. The electron beam from electron gun 20 initially causes the strongest evaporation of the refractory material in the direction indicated by arrow 23. The electron gun 20 may be of the Pierce-type or of the U-type described in U.S. Pat. No. 3,177,535.

The conveying means 24 shown in FIG. 1 include a chill roll or drum 25 axially rotatably driven by suitable means not shown and supply and rewind rollers 26 and 27 each suitably axially rotatably mounted on suitable support means (not shown). The conveying means 24 are adapted to convey a substrate material 28 such as a film structure of organic thermoplastic polymeric material, e.g., polyethylene terephthalate, in the direction indicated by arrow 29 at a controlled speed; the substrate 28 passes, in succession, from roller 26, around chill roll 25 and to rewind roller 27. A masking plate 30 is provided within chamber 10 adjacent chill roll 25 and intermediate chill roll 25 and crucible 18. The masking plate 30 is provided with a slot opening 31 aligned coaxially with chill roll 25 and is adapted to restrict deposition of evaporant 23 on substrate 28 only through slot 31.

Figure 2:
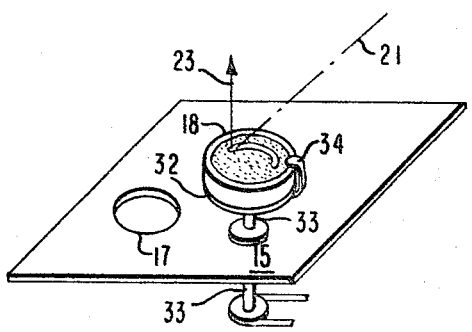
FIG. 2 is a perspective view showing construction details of the lower portion of the apparatus of FIG. 1.

The construction details shown in FIG. 2 illustrate the crucible 18 as mounted on a table 32 that is supported on shaft 33 that extends through bottom wall 15 of chamber 10. Crucible 18 is grounded to the table by means of bus 34. The shaft 33 is rotatably journaled in bottom wall 15 so that rotation of shaft 33 by any suitable means causes table 32 secured thereto to rotate which, in turn, is adapted to rotate crucible 18 supported thereon so as to present a fresh supply of refractory material into the path of electron beam 21 so as to provide a substantially constant spatial distribution of evaporant 23. One full rotation of crucible 18 may be made before new material need be added.

Figure 3:
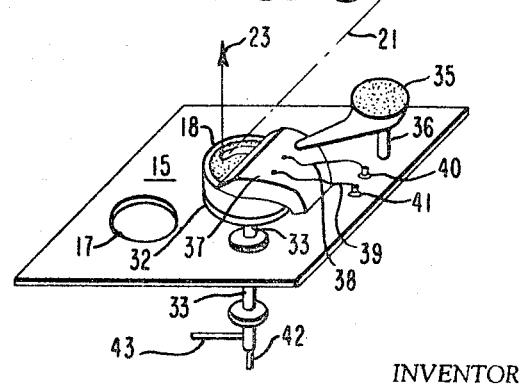
FIG. 3 is a perspective view showing only the lower portion of yet another embodiment of the apparatus of FIG. 1.

Another embodiment of the present invention is shown in FIG. 3. Rotatable shaft 33 and crucible 18 are similar to that shown in FIG. 2, but the system is adapted for longer operation. Item 35 is a hopper adapted to feed refractory material continuously into crucible 18 as the latter is rotated. In FIG. 3, hopper 35 is supported by a rod 36 that rests on bottom wall 15, and its supply end extends through duct 37 which is connected to a separate vacuum system (not shown) for the removal of outgases. Items 38 and 39 are electrical leads connected to terminals 40 and 41, respectively, secured to bottom wall 15 and which make a circuit through a resistance wire of a material such as tungsten or molybdenum inside duct 37. The resistance wire can be brought to incandescence and the heat falling upon the refractory preheats that material whereby adsorbed moisture and gases are released and removed therefrom which exit through duct 37. Cooling water may be admitted into conduit 42 and circulated through table 32 and removed through conduit 43 in order to cool crucible 18. Conduits 42 and 43 are actually hollow shafts disposed in concentric relation within hollow rotatable shaft 33 and suitably connected to flow passages for coolant in table 32. The crucible 18 is preferably cooled by circulating a coolant therethrough to remove heat and to protect the crucible from damage by contact with molten refractory.

It is to be understood that collection of the evaporant on a continuous substrate as shown in FIG. 1 is not limiting but may include other indexing mechanisms for sheets or parts as, for example, printed circuit boards with or without masks, and that a plurality of evaporating stations one or more of which may be located within the evacuated chamber 10 to deposit concurrently or in sequence one or more evaporants. Thus, a metal such as aluminum may be evaporated by induction heating simultaneously with $Al_2O_3$ being evaporated as by this invention or, it may be done sequentially if the purpose is to prepare capacitors with dielectric spacing. The evaporant region of the apparatus is preferably surrounded by material of the same composition. Further, since the electron beam is an electric current and therefor part of an electrical circuit, positive ground lead contacts may be provided to ensure proper current flow and avoid electrical disturbances and sparking. Although in general it is preferable to evaporate a single substance there are cases where blends are useful. Thus, silicon monoxide may be prepared by heating a mixture of aluminum and silica. Metals may also be blended with refractories to provide a conductive path. Thus, silica which is poorly conductive except in the melt may be blended with or coated with zirconium to improve the conductive path. In a poorly conductive media electrical discharge and spitting may occur with interruption and distortion of the electron beam pattern. In these cases of blending it must be recognized that small amounts of the second component may appear in the vapor deposit but this is not always deleterious.

The term "refractory" as employed herein means a substance difficult to fuse such as a ceramic (silica, alumina, zirconia and the like) or a cermet which is an alloy of a metal and nonmetal such as tungsten carbide, silicides and borides. The term "sublimable material" applies to substances such as silicon monoxide, magnesium, cadmium sulfide, tin dioxide and zinc sulfide which evaporate without forming a liquid phase.

The principle and practice of the present invention is illustrated by the following examples which are provided to show the practice and use thereof, but it is not intended that the invention be limited thereto since modifications in technique and operation will be apparent to anyone skilled in the art.

EXAMPLE 1

A graphite crucible 11 inches in diameter and 3 inches high with ½ inch walls was filled with 90 mesh Norton Type RR Alundum (+99 percent $Al_2O_3$) and placed on the rotating table of the apparatus of FIG. 3 and ground connected to the table with copper braid. The chamber was evacuated with mechanical and diffusion pumps to a vacuum of $10^{-3}$ torr (mm. of mercury). The electron beam gun was a self-accelerating Pierce type and was mounted on the side of the chamber with the center line of the beam at an angle of 60° to the crucible surface.

The electron beam gun was adjusted to a power level of 3 kw. and scanned an area $0.2 \times 2.4$ inches located 3.5 inches from the center line of the crucible. The crucible was rotated at 0.5 revolution per hour to heat the surface and remove adsorbed gases and vapors. The degassing was continued for one complete revolution.

After the degassing, the chamber pressure stabilized at $5.10^{-5}$ torr. A film of 1-mil Mylar* polyester film was passed over a chilled roll 5.2 inches in diameter from and directly above the evaporating area of the crucible. The film serves as a collector for the evaporant. The film traveled at 10 ft./min. The electron beam was set at a power level of 6.0 kw. and the crucible was rotated at the rate of one revolution per hour.

Samples of the coated film were taken from the beginning, middle and end of the roll. The thickness of deposit from the alumina was measured by X-ray fluorescence using a General Electric XRD-5 goniometer with a pentaerithritol analyzing crystal, a helium path and a gas flow proportional detector. The thickness was calculated from the aluminum K fluorescence line. The center thickness was about 300 Angstroms. The profile of thickness across the width of the film is shown in curve A in FIG. 4.

Figure 4:
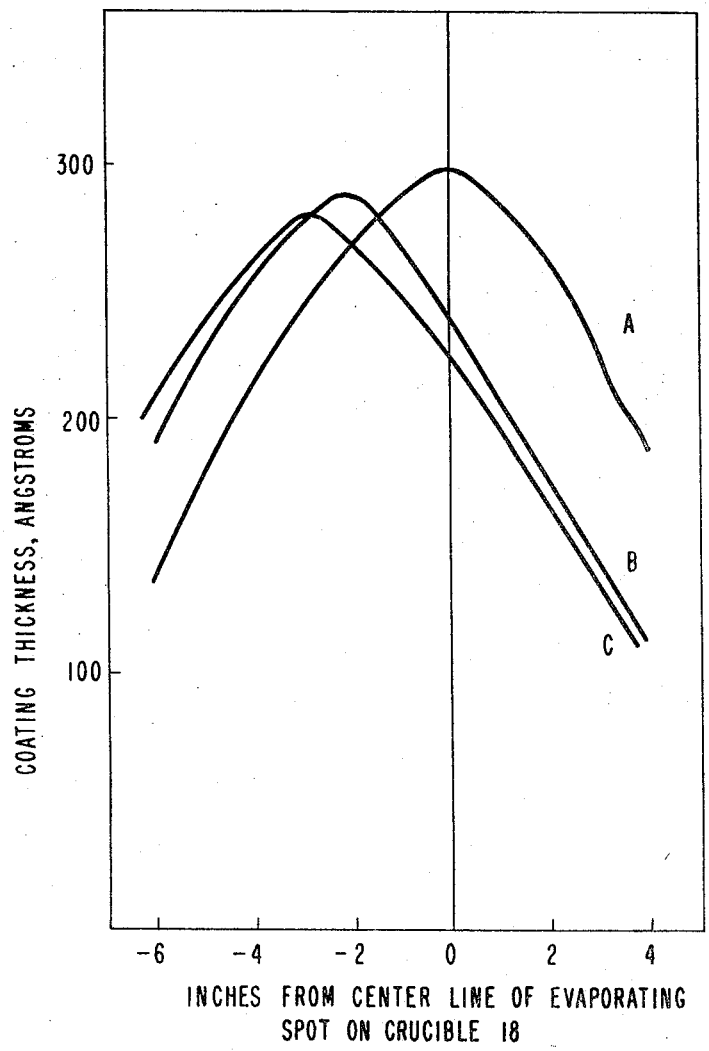
FIG. 4 is a comparison of thickness profiles across the width of coatings produced by the apparatus of this invention when using a rotating and a nonrotating crucible.

In order to demonstrate the problem of the prior art the crucible was not rotated during deposition. The curve A in FIG. 4 shows the initial distribution. After 4 minutes the distribution is shown as curve B, and after 8 minutes the distribution was as shown in curve C in FIG. 4. The center has shifted about three inches and the corresponding edges have shifted in thickness from 50 percent to a factor of 2.

As an additional control, the experiment was repeated without rotating the crucible. After the first undercut of the refractory material occurred the electron beam spot was moved two inches from the original location. There occurred an uncoated area for a few feet along the moving film and the film was found to be perforated by hot particles thrown from the source of refractory material. The coating distribution was improved in the initial deposit after the move, but again deteriorated as undercutting developed.

I claim:

1. In an apparatus for vapor deposition of refractory substances on substrate materials which comprises a chamber adapted to be vacuumized, means rotatably disposed within said chamber adapted to support a source of refractory material, supply means for feeding refractory material continuously into said source of refractory material on said rotatable means, electron-gun means operatively disposed in cooperative association with said chamber adapted to impinge a beam of electrons upon said refractory material, means for masking said substrate with openings therein, and means adapted to convey a substrate material adjacent said openings in said masking means within said chamber substantially in alignment with said source of refractory material whereby evaporation of said refractory material by electron bombardment deposits said refractory material on said substrate material and rotation of said source of refractory material permits a substantially uniform rate of evaporation thereof, the improvement including means cooperatively associated with said source of refractory material on said rotatable means for removing out gases from said refractory material.

2. The apparatus of claim 1 including means for heating said refractory material.

3. The apparatus of claim 2 including means for cooling said source of refractory material on said rotatable means.